United States Patent [19]

Thomspon et al.

[11] Patent Number: 4,959,807

[45] Date of Patent: Sep. 25, 1990

[54] DEVICE FOR MEASURING THE SPEED OF A MOVING OBJECT

[75] Inventors: Mitchell L. Thomspon, Exton; Kyung T. Park, Upper Darby; Kumar Ogale, Philadelphia; William B. Powers, Exton, all of Pa.

[73] Assignee: Atochem North America, Inc., Philadelphia, Pa.

[21] Appl. No.: 255,932

[22] Filed: Oct. 11, 1988

[51] Int. Cl.$^5$ .............................................. G01P 3/66
[52] U.S. Cl. ..................................... 364/565; 364/550; 377/20; 324/178; 73/493; 73/506; 73/510
[58] Field of Search ................ 364/565, 550, 508; 324/160, 178, 179, 180; 377/20; 73/488, 493, 506, 507, 510, 526

[56] References Cited

U.S. PATENT DOCUMENTS

| | | | |
|---|---|---|---|
| 2,294,730 | 9/1942 | Eggers | 161/18 |
| 2,819,085 | 1/1958 | Brown et al. | 273/102.2 R |
| 3,222,596 | 12/1965 | Meyer et al. | 324/180 |
| 3,274,828 | 9/1966 | Pulvari | 73/141 |
| 3,469,843 | 9/1969 | Hubbard | 273/102.2 R |
| 3,587,291 | 6/1971 | Escallier et al. | 73/12 |
| 3,602,510 | 8/1971 | Knippel et al. | 273/102.2 R |
| 3,971,250 | 2/1975 | Taylor | 73/88.5 |
| 3,987,320 | 7/1975 | Merhar | 310/8.4 |
| 4,031,373 | 6/1976 | Beckwith | 235/151.32 |
| 4,352,064 | 9/1982 | Dunn | 324/178 |
| 4,385,227 | 5/1983 | Bridges | 377/20 |
| 4,546,658 | 2/1984 | Rocha et al. | 73/862.59 |
| 4,592,001 | 5/1986 | Willard | 364/565 |
| 4,763,284 | 8/1988 | Carlin | 364/508 |

Primary Examiner—Parshotam S. Lall
Assistant Examiner—Brian M. Mattson
Attorney, Agent, or Firm—Seidel, Gonda, Lavorgna & Monaco

[57] ABSTRACT

A device for measuring the speed of a moving object has first and second impact detectors separated by a preselected known distance and disposed in the path of movement of the object. As the object strikes the first and second detectors, the detectors each produce a signal. The signals are separated by a time interval indicative of the distance between the detectors. The elapsed time between the signals is measured by a counter device, and the speed of the object is calculated by a programmable device.

16 Claims, 3 Drawing Sheets

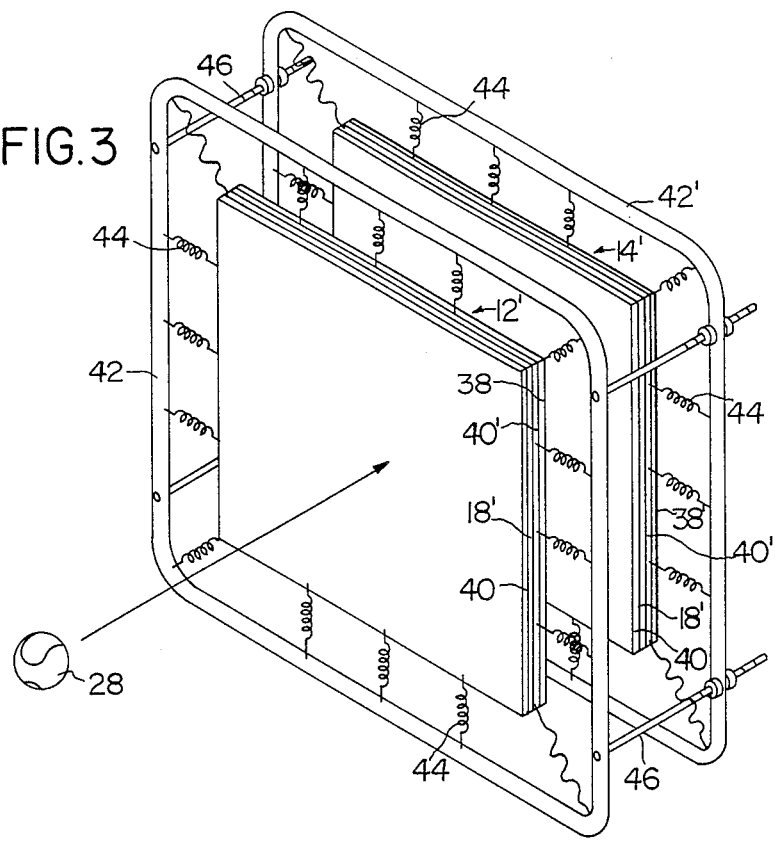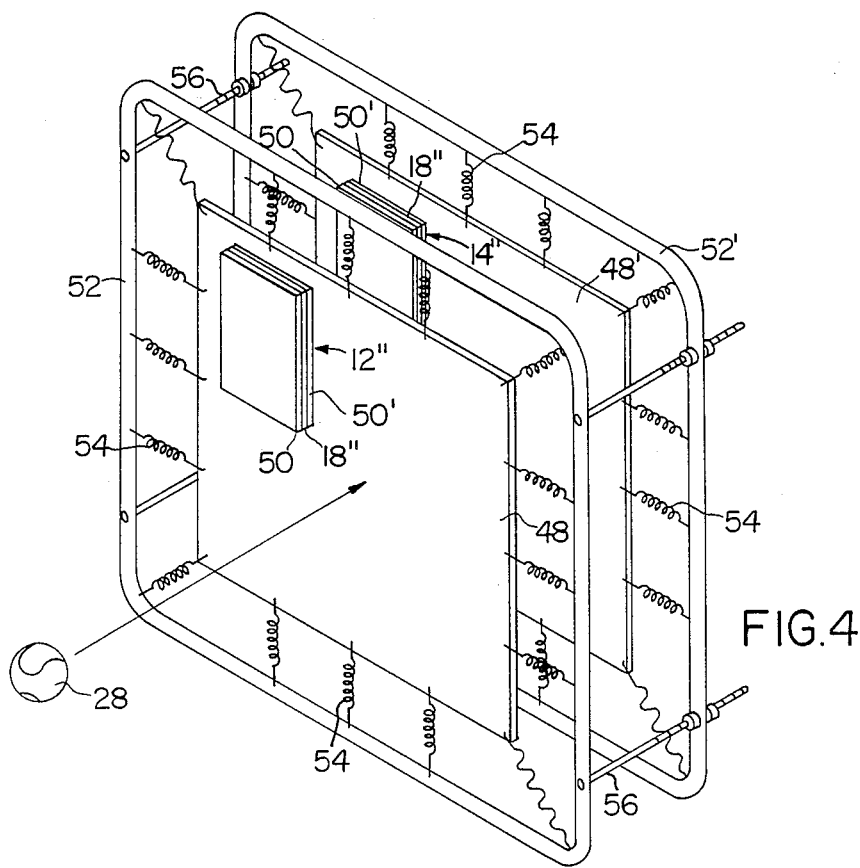

DEVICE FOR MEASURING THE SPEED OF A MOVING OBJECT

BACKGROUND OF THE INVENTION

The present invention relates to a device for measuring the speed of a moving object, for example, a baseball or similar object.

The most common commercial device in use today for measuring the speed of such objects is a radar gun. However, a radar gun is expensive and does not always produce accurate readings Accordingly, there is a need for an inexpensive yet accurate speed measuring device.

The present invention enables the speed of a baseball or similar object to be measured inexpensively but with high accuracy. The invention can be used in other sporting events to measure, for example, the speed of a tennis ball, golf ball or soccer ball. The invention can also be used to measure the speed of the swing of a baseball bat, or hand and foot speed in delivering a blow in martial arts or boxing-type sports. The invention is also applicable in non-sporting contexts, such as, for example, in the automotive industry to calculate the speed of a test dummy in simulated auto crashes or to calibrate the speed of a test vehicle.

SUMMARY OF THE INVENTION

The present invention is an apparatus for measuring the speed of a moving object and comprises a first and second impact detection means disposed in the path of the moving object. Each detection means generates a pulse signal as the object strikes it. The first and second detection means are separated by a known preselected distance. A gas or other highly compliant medium is located between the first and second detection means. A counter means responsive to the signals generated by the first and second detection means is provided for measuring the elapsed time interval between the respective signals from the first and second detection means. A computing means computes speed of the object using the elapsed time interval and the known preselected distance separating the two detection means.

DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 3. is an isometric view of a second embodiment of the invention.

FIG. 4 is an isometric view of a third embodiment of the invention.

DESCRIPTION OF THE INVENTION

Figure 1:
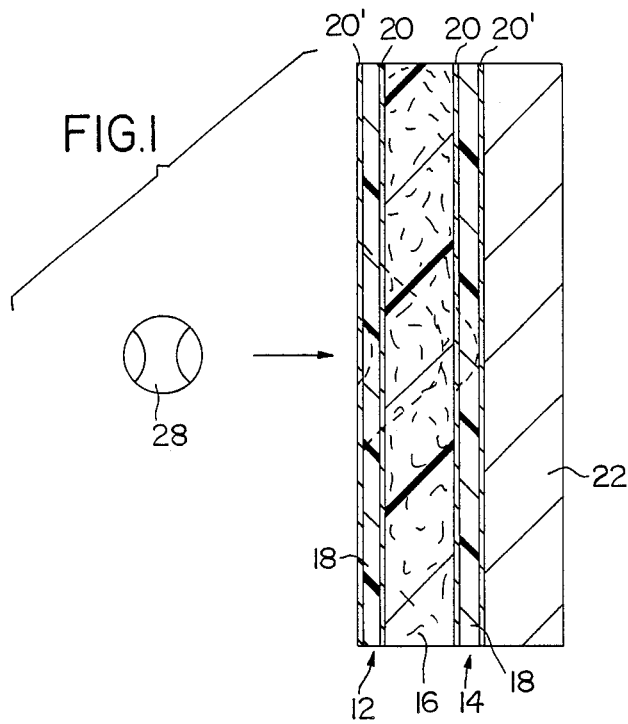
FIG. 1 is a sectional view of a portion of the invention illustrating the mechanical structure of the invention.

Referring now to the drawings, wherein like numerals indicate like elements, there is shown in FIG. 1 a speed measuring apparatus 10 according to the invention. The apparatus 10 comprises first and second impact detection means in the form of a first transducer 12 and a second transducer 14 separated from each other by an intermediate layer 16. Layer 16 is preferably an easily compressible foam material, but may also be a gas (such as air) or any other compliant medium If a foam material is used, the material is selected to make any material-related non-linearities due to compression insignificant. For convenience, the invention is described with reference to a foam layer 16.

Each transducer 12 and 14 preferably comprises a layer of flexible piezoelectric film 18 with an inner electrode coating 20 and an outer electrode coating 20'. Film 18 may be a polyvinylidene fluoride polymer, or PVDF, or other piezoelectric polymer material The inner electrode coating 20 of the first transducer 12 is in face contact with one of the surfaces of layer 16 The inner electrode coating 20 of the second transducer 14 is in face contact with the opposite surface of layer 16. The outer electrode coating 20' of the second transducer 14 is in face contact with one surface of a substantially rigid mounting plate 22, which supports the transducers 12, 14 and the compliant layer 16. Plate 22 may be any suitable substantially rigid material such as wood, metal, polycarbonate plastic, and so forth.

Plate 22 may be mounted on a stand, suspended from above or affixed to a wall, for example, to support apparatus 10 at a height and orientation appropriate to its intended use. For example, to measure speed of a baseball, apparatus 10 is preferably positioned in the approximate area of the strike zone, while to measure impact speed of a blow in boxing, apparatus 10 is positioned at the height of a human torso.

Figure 2:
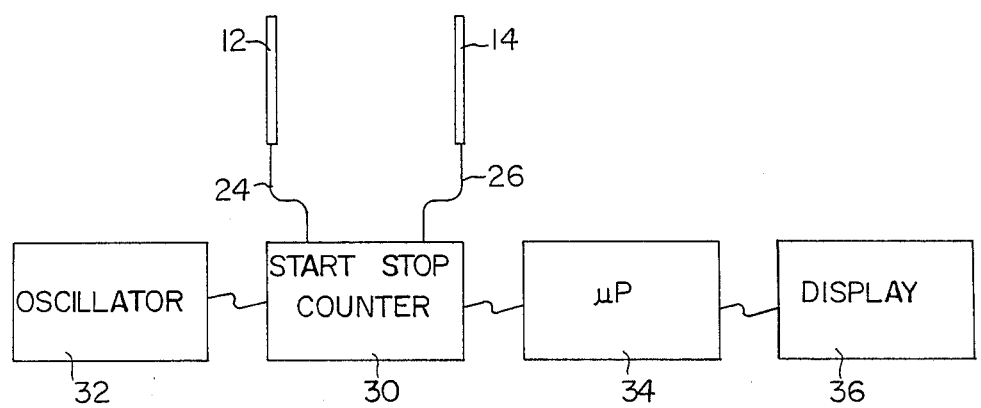
FIG. 2 is a simplified block diagram of the invention.

First transducer 12 is connected to the "START" input of a conventional electronic counter 30 by a pair of electrically-conductive leads 24 which are attached to the electrodes 20, 20' of first transducer 12 (see FIG. 2). Second transducer 14 is similarly connected to the "STOP" input of counter 30 by a pair of leads 26. Counter 30 may be any suitable interval counter, well-known in the art, and is driven by oscillator 32 which provides a reference frequency for counter 30. As will be clearly understood by those skilled in the art, a signal on the "START" input of counter 30 will cause the counter to accumulate the number of cycles or periods of the oscillator 32 output which are supplied to counter 30. The accumulation continues until a signal is received at the "STOP" input. The accumulated number of cycles or periods is thus representative of the elapsed time interval between the occurrence of the "START" and "STOP" signals.

In operation, when a baseball or other object 28 whose speed is to be measured, shown (not to scale) travelling toward the device in FIG. 1, strikes the first transducer 12, it causes transducer 12 to generate an electric pulse signal at the instant of impact. This pulse signal is sent through leads 24 to the "START" input of counter 30, causing counter 30 to begin counting. Because transducer 12 comprises a flexible piezoelectric film, it does not stop the continued forward motion of object 28. Rather, transducer 12 deforms inwardly under impact, compressing layer 16, as shown in phantom in FIG. 1. As object 28 continues to travel forward, it strikes second transducer 14, through foam 16, causing transducer 14 to generate an electric pulse signal which is sent through leads 26 to the "STOP" input of counter 30, causing counter 30 to stop counting. Further forward movement of object 28 is stopped by plate 22.

By using the elapsed time measured by counter 30 between the "START" and "STOP" signals, the speed of object 28 can be calculated by an appropriately programmed microprocessor or other programmable device 34. Programmable device 34 can be programmed to calculate object speed from the elapsed time interval and the known spacing between the first and second transducers using the formula $v = x/t$, where $v$=speed, $x$=spacing between transducers and $t$=elapsed time interval. Programmable device 34 can also be programmed to drive a suitable display 36, which may be an LED or liquid crystal display, for example, to display calculated speed to the user.

In an alternate embodiment, shown in FIG. 3, first and second transducers 12' and 14' each preferably comprise a layer of flexible piezoelectric film 18'. On opposite sides of each film 18' are electrode coatings 40, 40', respectively. Transducers 12' and 14' are mounted on resilient, porous sheets 38 and 38' respectively, such that each transducer covers one entire side (either the front or the back) of the respective sheet on which it is mounted. Sheets 38, 38' may, for example, be made of a porous canvas material. Sheet 38, covered on one side by transducer 12', is stretch mounted on a frame 42 by, for example, springs 44. Sheet 38', covered on one side by transducer 14', is similarly stretch mounted on a frame 42'.

Frames 42 and 42' are spaced apart at a known fixed distance and secured together with fasteners 46. Fasteners 46 can be cylindrical rods or any other device for joining frames 42 and 42' together while at the same time keeping them separated apart at a known fixed distance. The distance between frames 42 and 42' is preferably small. Typically, air occupies the space located between transducer 12' and 14' However, it is understood that any easily compressible foam material could be placed between the two transducers.

First transducer 12' is disposed in the path of movement of object 28. As with first transducer 12 in the first embodiment (described above), in this embodiment first transducer 12' is connected to the "START" input of a conventional electronic counter 30, of the type shown in FIG. 2, by a pair of electrically-conductive leads (not shown) which are attached to the electrode coatings 40, 40' on each side of first transducer 12'. Second transducer 14' is similarly connected to the "STOP" input of counter 30 by a pair of leads (not shown). As described in connection with the first embodiment, counter 30 is driven by oscillator 32 which provides a reference frequency for counter 30. A signal on the "START" input of counter 30 will cause the counter to accumulate the number of cycles or periods of the oscillator 32 output which are supplied to counter 30. The accumulation continues until a signal is received at the "STOP" input The accumulated number of cycles or periods is thus representative of the elapsed time interval between the occurrence of the "START" and the "STOP" signals.

In operation, when a baseball or other object 28 whose speed is to be measured, shown travelling toward the device in FIG. 3, strikes the first transducer 12', it causes it to generate an electric pulse signal at the instant of impact. This pulse signal is sent to the "START" input of counter 30 by leads (not shown), causing counter 30 to begin counting. Because transducer 12' comprises flexible piezoelectric film which is mounted on a resilient sheet attached with springs to a frame, it does not stop the continued forward motion of object 28. Rather, it deforms inwardly under impact, allowing object 28 to continue to travel and strike second transducer 14', through transducer 12', causing transducer 14' to generate an electric pulse signal at the instant of impact. This second signal is sent by leads (not shown) to the "STOP" input of counter 30, causing counter 30 to stop counting. The deformed canvas and the stretched springs then return to their original position arresting further forward movement of object 28 and returning it to the thrower by way of a restoring force as the springs relax.

Using the elapsed time measured by the counter 30 between the "START" and "STOP" signals, the speed of object 28 can be calculated by an appropriately programmed microprocessor or other programmable device 34. As described in connection with the first embodiment, programmable device 34 can be programmed to calculate object speed and to drive a suitable display 36 in order to display calculated speed to the user.

Figure 5:
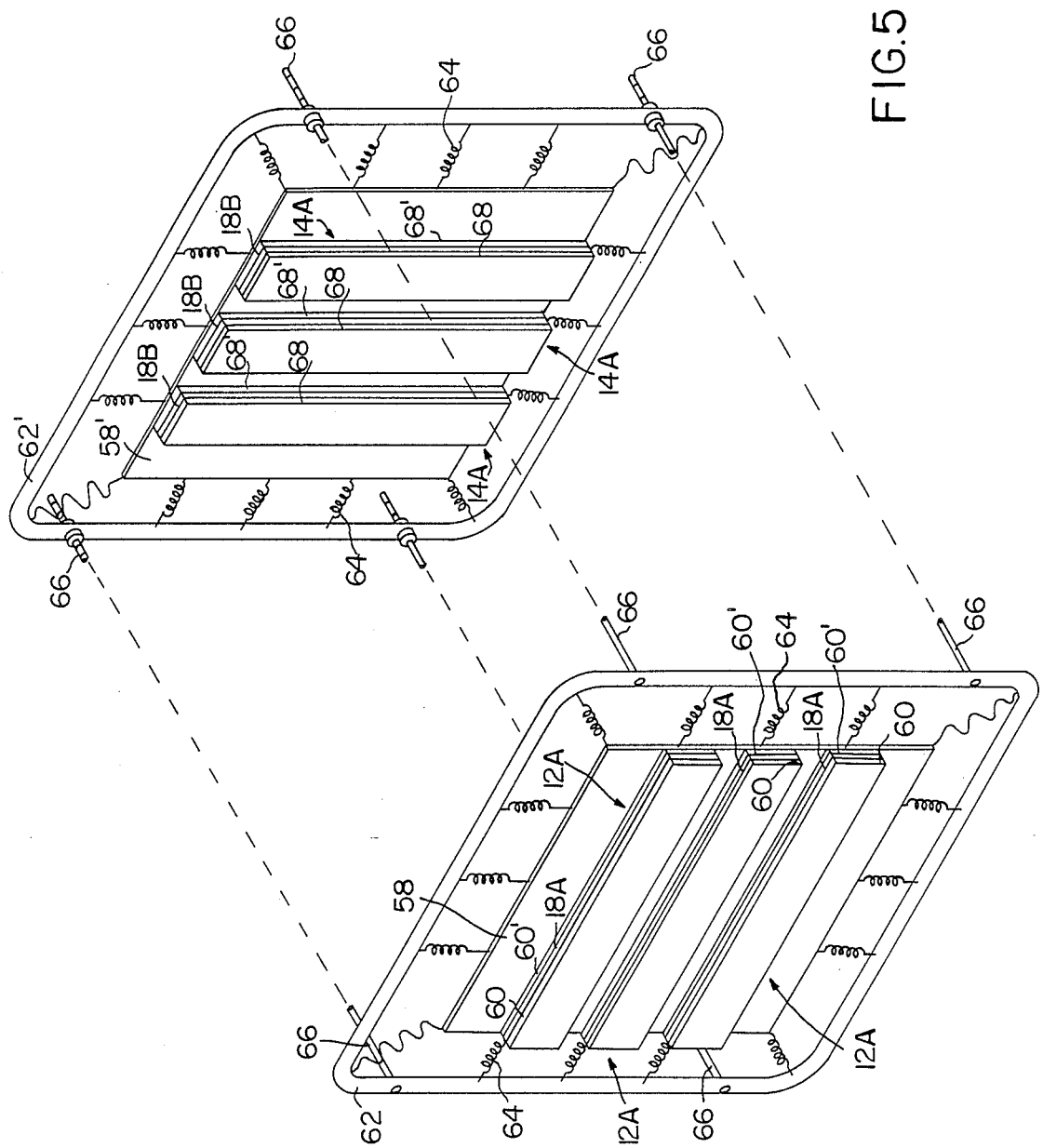
FIG. 5 is an exploded isometric view of a fourth embodiment of the invention.

Sheets 38 and 38' are made of a porous material which allows air to pass through it freely. However, as described above, transducers 12' and 14' each cover one entire side of sheets 38 and 38', respectively. Transducers 12' and 14' are not porous. Because of this, when the transducers are compressed by object 28, the air which occupies the space between the two transducers cannot easily pass through the layered combination of film and porous sheet. Thus, when object 28 strikes first transducer 12', starting the counter, the inward deformation of the transducer and sheet 38, rather than allowing the air to escape, pushes the air between sheets 38 and 38' ahead of it and toward transducer 14' mounted on sheet 38'. The compressed air will strike transducer 14' a short time before object 28. The impact of the compressed air on transducer 14' could cause the transducer to generate a premature signal, thus causing counter 30 to stop counting before object 28 has actually struck transducer 14'. The recorded elapsed time in this case is inaccurate and would result in an inaccurately calculated (i.e. faster) speed. FIGS. 4 and 5 show a third and fourth embodiment of the present invention, both of which minimize this problem.

In the third embodiment, shown in FIG. 4, first and second transducers 12" and 14" each preferably comprise a layer of flexible piezoelectric film 18". Opposite surfaces of each film 18' are covered with electrode coatings 50 and 50', respectively. Transducers 12" and 14" are mounted on a small portion of the surface of one side of resilient sheets 48 and 48', respectively, leaving a substantial portion of the sheets exposed. Sheets 48 and 48' are preferably made of a porous canvas material. Thus, when sheet 48 is struck by object 28, the air between sheets 48 and 48' can pass through the portion of porous sheets 48 and 48' not covered by transducers 12" and 14". As with the second embodiment, in this embodiment each sheet is stretch mounted, for example, with springs 54, on an individual frame 52 or 52'. Frames 52 and 52' are spaced apart and secured together with fasteners 56. Like fasteners 46 in FIG. 3, fasteners 56 can be cylindrical rods or any other device for joining the frames 52 and 52' together while at the same time keeping them separated by a known fixed distance. The distance between frames 52 and 52' is preferably small.

In use, sheet 48 is disposed in the path of movement of object 28. When object 28 strikes sheet 48, it generates an impact shock wave that propagates through sheet 48 and is detected by transducer 12", causing transducer 12" to generate a pulse signal representative of the impact on sheet 48. Because sheet 48 is made of a resilient material and is attached to a frame 52 with springs 54, it does not stop the continued forward motion of object 28. Rather, it deforms inwardly under impact allowing object 28 to continue to travel forward and strike sheet 48', through sheet 48, generating an impact shock wave within sheet 48'. The shock wave propagates through sheet 48' and is detected by transducer 14", causing transducer 14" to generate a pulse signal representative of the impact on sheet 48'.

Sheets 48 and 48' are made of the same material, chosen such that an impact shock wave will propagate at identical speeds in both sheets. The time it takes for the shock to travel from the point of impact through the sheet to the transducer is called the "propagation delay time". Thus, if $t_{p1}$ is the propagation delay time for a shock wave in sheet 48 (for example, the time for a shock wave, generated at time $t_1$ by the impact of object 28 on sheet 48, to propagate through sheet 48 to the point on its surface where transducer 12" is mounted) then the pulse signal from transducer 12", sent by leads (not shown) to the "START" input of counter 30, occurs at time $t_1 + t_{p1}$. Similarly, if the object strikes sheet 48' at time $t_1$, and sheet 48' has a propagation time of $t_{p2}$, the pulse signal from transducer 14", sent by leads (not shown) to the "STOP" input of counter 30, occurs at time $t_2 + t_{p2}$. The elapsed time from start to stop, then, is $t = (t_2 + t_{p2}) - (t_1 + t_{p1})$. If $t_{p1} = t_{p2}$, then $t = t_2 - t_1$, yielding an accurate measurement of elapsed time between the "START" and "STOP" signals independent of actual propagation time, and hence independent of the material used for sheets 48 and 48'.

By using the elapsed time between the "START" and "STOP" signals, as measured by counter 30 of the type shown in FIG. 2, the speed of object 28 can be calculated by an appropriately programmed microprocessor or other programmable device 34. As described in connection with the first embodiment, programmable device 34 can be programmed to calculate an object's speed from the elapsed time interval and the known spacing between first and second transducers using the formula $v = x/t$ where $v$ = speed, $x$ = spacing between transducers and $t$ = elapsed time interval, calculated by using the formula for propagation delay time in the given medium. Programmable device 34 can also be programmed to drive a suitable display 36, which may be an LED or liquid crystal display, for example, to display calculated speed to the user.

In a fourth embodiment, shown in FIG. 5, resilient, porous sheets 58 and 58' are each stretch mounted, for example, with springs 64, on an individual frame 62 or 62'. Frames 62 and 62' are spaced apart and secured together with fasteners 66. Fasteners 66 can be cylindrical rods or any other device for joining the frames 62, 62' together while at the same time keeping them separated apart at a known fixed distance. The distance between frames 62, 62' is preferably small.

Sheets 58, 58' may, for example, be made of porous canvas material. Mounted on either the front or the back of sheet 58 are one or more transducer strips 12A. Each strip is placed parallel to, and spaced apart from, each of the other strips, and preferably comprises a layer of flexible piezoelectric film 18A. The opposite surfaces of film 18A are covered with an electrode coating 60 and 60', respectively. Film 18A has a known polarity. Mounted on either the front or the back of sheet 58' are one or more transducer strips 14A. Each strip is placed parallel to, and spaced apart from, each of the other strips, and preferably comprises a layer of flexible piezoelectric film 18B. The opposite surfaces of film 18B are covered with an electrode coating 68 and 68', respectively. Film 18B is mounted such that it has the opposite polarity with respect to film 18A. Transducer strips 12A and 14A are oriented at a 90° angle with respect to each other. Because of the strip configuration of the transducers, substantial portions of sheets 58 and 58' are left exposed.

In use, sheet 58 is disposed in the path of movement of an object 28. As described in connection with the above described embodiments, when object 28 strikes sheet 58, it causes one or more of the transducers 12A to generate a pulse signal at the instant of impact. Therefore, inaccurte responses due to the premature impact on sheet 58' of air pressure built up behind sheet 58 are greatly reduced. That is, the air behind sheet 58 can escape through the exposed portions of the porous material of sheet 58 between transducer strips 12A and 14A. In this way, the air pressure has little effect on the output signal generated by second transducer strips 14A. Object 28 continues to travel after striking sheet 58 and strikes sheet 58', through sheet 58, causing one or more of transducer strips 14A to generate an electric pulse signal at the instant of impact. The deformed canvas and the stretched springs then return to their original position, arresting further forward motion of object 28 and returning it by way of a restoring force to the thrower. The speed of object 28 is then calculated as described for the previously-described embodiments.

The present invention may be embodied in other specific forms without departing from the spirit or essential attributes thereof and, accordingly, reference should be made to the appended claims, rather than to the foregoing specification, as indicating the scope of the invention.

We claim:

1. Apparatus for measuring speed of a moving object, comprising:
   (a) first impact detection means disposed in a path of movement of the object including a piezoelectric film transducer for generating an electrical signal upon an impact on the first impact detection means;
   (b) second impact detection means, disposed in the path of movement of the object, parallel to and separated by a preselected distance from the first impact detection means including a transducer for generating an electrical signal upon an impact on the second impact detection means, the respective signals from the first and second impact detection means being separated by a time interval representative of the preselected distance;
   (c) means responsive to the respective signals from the first and second impact detection means for measuring the time interval between the respective signals; and
   (d) computing means for computing the speed of the object from the time interval.

2. The apparatus of claim 1 further comprising display means for displaying the computed speed to an operator.

3. The apparatus of claim 1, wherein said first and second impact detection means each comprise a piezoelectric film transducer having a conductive coating on two surfaces.

4. Apparatus for measuring speed of a moving object, comprising:
   (a) a first piezoelectric film transducer disposed in a path of movement of the object for producing a signal upon an impact thereon;

(b) a second piezoelectric film transducer disposed in the path of movement of the object, parallel to and separated by a fixed distance from the first transducer, for producing a signal upon an impact thereon, the respective signals from the first and second transducers being separated by a time interval representative of the fixed distance;

(c) a compliant medium disposed between and in contact with the first and second transducers;

(d) counter means responsive to the respective signals from the first and second transducers for measuring the time interval between the respective signals; and (e) computing means for computing the speed of the object from the time interval.

5. The apparatus of claim 4 further comprising frame means adapted to support the first and second transducers and the compliant medium.

6. The apparatus of claim 5, further comprising means for adjusting the height of the frame means.

7. Apparatus for measuring speed of a moving object, comprising:

(a) a first piezoelectric film transducer, having conductive coatings on two surfaces, disposed in a path of movement of the object for generating a signal upon impact of the object on the first transducer;

(b) a second piezoelectric transducer, having conductive coatings on two surfaces, disposed in the path of movement of the object and spaced apart by a preselected distance from the first piezoelectric transducer, for generating a signal upon an impact thereon, the respective signals from the first and second transducers being separated by a time interval representative of the preselected distance;

(c) a compliant medium disposed between and in contact with the first and second piezoelectric transducer means;

(d) counter means responsive to the respective signals from the first and second piezoelectric transducers for measuring the time interval between the signal from the first piezoelectric transducer and the signal from the second piezoelectric transducer;

(e) programmable means for computing the speed of the object based on the time interval between the signal from the first piezoelectric transducer and the signal from the second piezoelectric transducer and the distance between the first and second piezoelectric transducers; and (f) means for displaying the computed speed of the object.

8. The apparatus of claim 7 wherein the first and second piezoelectric transducers are each respectively mounted on first and second resilient support means, said support means being secured together and being separated by a known fixed distance.

9. The apparatus of claim 8 wherein said first and second resilient support means are made of a porous material.

10. The apparatus of claim 9 wherein the first and second transducers respectively cover an entire surface of one side of each resilient support means.

11. The apparatus of claim 9 wherein the first and second transducers respectively cover only a portion of the entire surface of each resilient support means.

12. The apparatus of claim 9 wherein the first transducer comprises a plurality of strips spaced apart and arranged in parallel on the first resilient support means, and the second transducer comprises a plurality of strips spaced apart and arranged in parallel on the second resilient support means and oriented at a ninety degree angle with respect to the first transducer strips.

13. The apparatus of claim 7 wherein the first and second piezoelectric transducers are respectively mounted on an entire surface of one side of the first and second resilient support means.

14. Apparatus as in claim 7 wherein the first and second piezoelectric transducers are respectively mounted on and cover only a portion of the surfaces of the first and second resilient support means.

15. Apparatus for measuring the speed of a moving object, comprising:

(a) a first impact detection means disposed in a path of movement of the object, including a first resilient support means with a plurality of piezoelectric transducer strips mounted thereon, the transducer strips being parallel and spaced apart for generating a signal upon impact thereon;

(b) second impact detection means for producing a signal upon an impact thereon, disposed in the path of movement of the object and spaced a preselected distance from the first impact detection means, including a second resilient support means with a plurality of transducer strips mounted thereon, the transducer strips being parallel and spaced apart so that the transducer strips on the second impact detection means are oriented at an angle of 90° relative to the strips on the first impact detection means;

(c) said first and second resilient support means being made of a porous material and being secured together;

(d) a compliant medium of a thickness equal to the preselected distance between and in contact with the first and second impact detection means;

(e) counter means responsive to the respective signals from the first and second impact detection means for measuring the time interval between the respective signals;

(f) programmable means for computing the speed of the object based on the time interval between the signal from the first impact detection means and the signal from the second detection means and the distance between the first and second impact detection means; and (g) display means responsive to the programmable means for displaying computed speed of the object.

16. Apparatus for measuring speed of an object moving in a path, comprising:

(a) first and second impact detection means separated by a preselected distance, substantially parallel to each other and disposed in the path of movement of said object, a transducer associated with each of said detection means for generating an electrical signal on impact of said detection means, said first detection means being flexible and deformable whereby impact of said moving object thereon produces an electrical signal and deforms said first detection mean without penetration thereof to thereby cause an impact on said second detection means and produce an electrical signal therefrom, said electrical signal separated by a time interval indicative of the distance between said first and second detection means;

(b) means responsive to the respective signals from the first and second impact detection means for measuring said time interval between the respective signals; and (c) computing means for computing the speed of the object from the time interval.

* * * * *